(12) United States Patent
Chen et al.

(10) Patent No.: US 6,933,349 B2
(45) Date of Patent: Aug. 23, 2005

(54) LOW ODOR INSULATION BINDER FROM PHOSPHITE TERMINATED POLYACRYLIC ACID

(75) Inventors: Liang Chen, New Albany, OH (US); William Downey, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 247 days.

(21) Appl. No.: 09/814,034

(22) Filed: Mar. 21, 2001

(65) Prior Publication Data

US 2003/0008978 A1 Jan. 9, 2003

(51) Int. Cl.$^7$ .................................................. C08F 8/14
(52) U.S. Cl. ................ 525/329.8; 524/556; 525/330.6; 525/340; 525/384
(58) Field of Search ........................ 525/329.8, 330.6, 525/340, 384; 524/556

(56) References Cited

U.S. PATENT DOCUMENTS

| | | |
|---|---|---|
| 5,077,361 A | 12/1991 | Hughes et al. |
| 5,294,686 A | 3/1994 | Fiarman et al. |
| 5,318,990 A | 6/1994 | Strauss |
| 5,340,868 A | 8/1994 | Strauss et al. |
| 5,578,371 A | 11/1996 | Taylor et al. |
| 5,646,207 A | 7/1997 | Schell |
| 5,661,213 A | 8/1997 | Arkens et al. |
| 5,670,585 A | 9/1997 | Taylor et al. |
| 5,718,728 A | 2/1998 | Arkens et al. |
| 5,763,524 A | 6/1998 | Arkens et al. |
| 5,770,555 A | 6/1998 | Weinstein |
| 5,840,822 A | 11/1998 | Lee et al. |
| 5,858,549 A | 1/1999 | Kielbania, Jr. et al. |
| 5,866,664 A | 2/1999 | McCallum, III et al. |
| 5,891,972 A | 4/1999 | Egraz et al. |
| 5,932,665 A | 8/1999 | DePorter et al. |
| 5,932,689 A | 8/1999 | Arkens et al. |
| 5,977,224 A | 11/1999 | Cheung et al. |
| 5,977,232 A | 11/1999 | Arkens et al. |
| 6,136,916 A | 10/2000 | Arkens et al. |
| 6,194,512 B1 | 2/2001 | Chen et al. |
| 6,207,737 B1 | 3/2001 | Schell et al. |
| 6,218,483 B1 | 4/2001 | Muthiah et al. |
| 6,221,973 B1 | 4/2001 | Arkens et al. |
| 6,241,780 B1 | 6/2001 | Arkens et al. |
| 6,274,661 B1 * | 8/2001 | Chen et al. ................ 524/388 |
| 6,331,350 B1 | 12/2001 | Taylor et al. |

FOREIGN PATENT DOCUMENTS

| | | |
|---|---|---|
| EP | 405818 | 1/1991 |
| EP | 583086 | 2/1994 |
| EP | 990727 | 4/2000 |
| EP | 990728 | 4/2000 |
| WO | WO 99/61384 | 12/1999 |
| WO | WO 01/00699 | 1/2001 |

* cited by examiner

Primary Examiner—Bernard Lipman
(74) Attorney, Agent, or Firm—Inger H. Eckert; Maria C. Gasaway

(57) ABSTRACT

A binder composition, obtained by polymerizing acrylic acid monomer in water in the presence of a cure accelerator comprising an alkali metal salt of a phosphorous-containing inorganic acid to form a low molecular weight polyacrylic acid and subsequently reacting said low molecular weight polyacrylic acid with a polyhydroxy crosslinking agent in a crosslinking step to make a composition suitable for use as a component in a binder for fiberglass. A significant improvement involves conducting the crosslinking step in the absence of added catalyst. Moreover, satisfactory results are obtained in the absence of conventional undesirable sulfur odors.

15 Claims, 2 Drawing Sheets

(2 of 2 Drawing Sheet(s) Filed in Color)

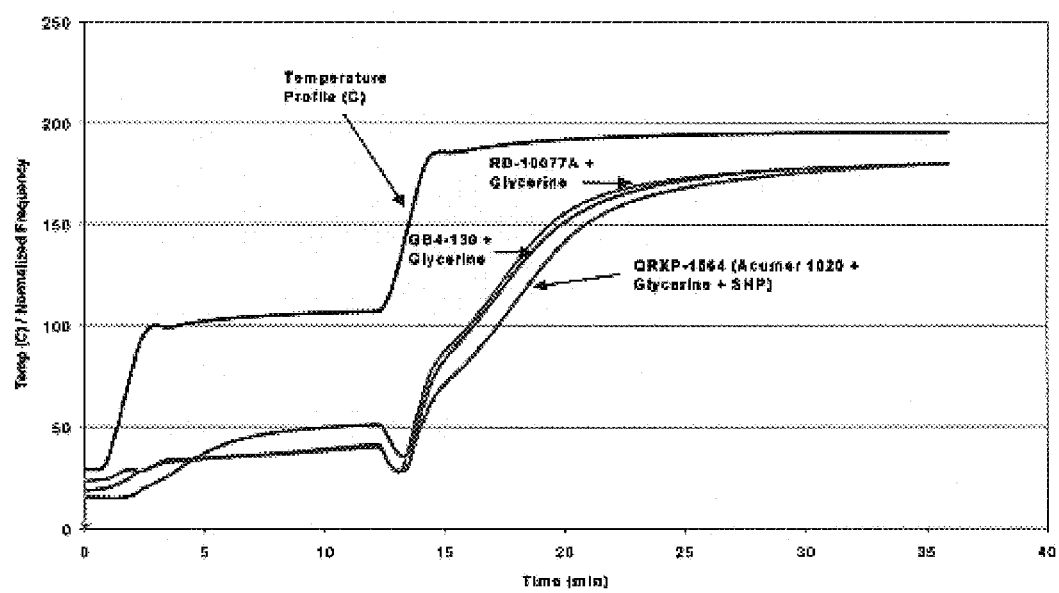
Fig. 1. DMA for Polyacrylic Acid Binders using Glycerine as Crosslinker

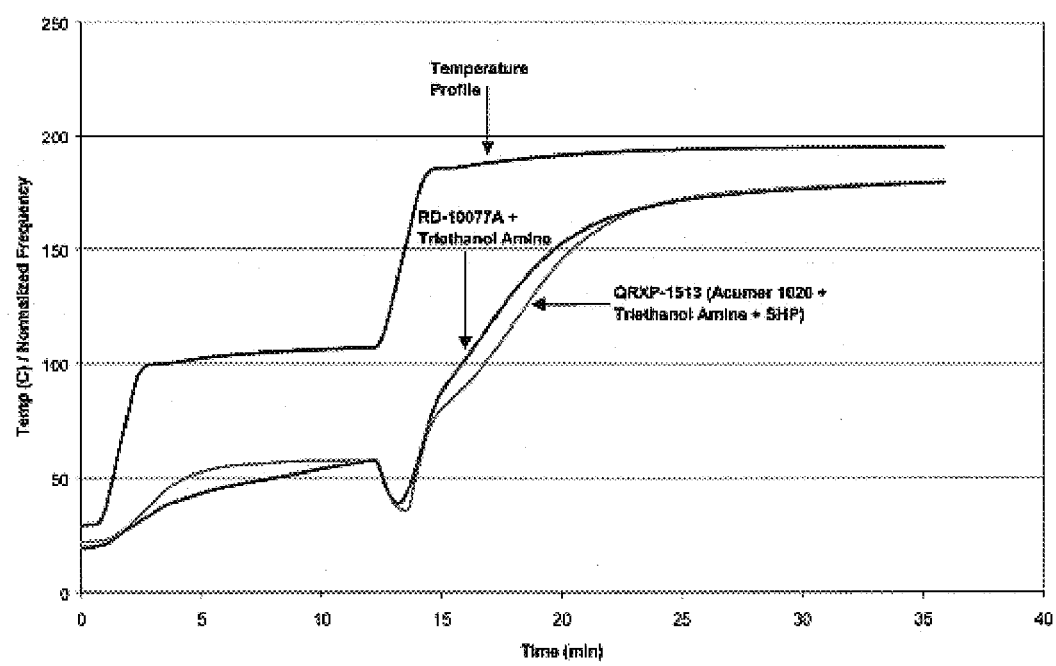

LOW ODOR INSULATION BINDER FROM PHOSPHITE TERMINATED POLYACRYLIC ACID

TECHNICAL FIELD AND INDUSTRIAL APPLICABILITY OF THE INVENTION

The present invention relates to fiberglass insulation. More specifically, the present invention provides a binder for fiberglass insulation, which enables the manufacture of fiberglass insulation products having improved odor profiles.

BACKGROUND OF THE INVENTION

Conventional polyacrylic acid-based fiberglass insulation binders are typically manufactured with a low molecular weight polyacrylic acid, a polyhydroxy crosslinking agent, and a cure accelerator, such as sodium hypophosphite. Typical commercial embodiments include QRXP-1564 and QRXP-1513, produced by Rohm & Haas. QRXP-1564 is a blend of Acumer 1020 (71.6 wt-%), glycerol (21.8 wt-%), sodium hypophosphite (5.6 wt-%), and a small amount of corrosion inhibitor. Water is added as a diluent. QRXP-1513 is a blend of Acumer 1020, triethanolamine, and sodium hypophosphite. Water is added as a diluent. Acumer 1020 is a polyacrylic acid produced from acrylic acid monomer and a sodium bisulfite reactant. Acumer 1020 has a molecular weight of approximately 2000 and a sulfur content of about 3.4 wt-%. U.S. Pat. Nos. 5,340,868, 5,661,213, and 5,763,524, as well as PCT publications WO 100 699 A2 and WO 9 961 384 A1, disclose conventional sulfur-containing polyacrylic acid-based fiberglass insulation binders.

The low molecular weight polyacrylic acid used for the above binders normally is prepared by aqueous polymerization, the polymerization being regulated with sodium bisulfite or a similar sulfite compound to give the desired molecular weight. During high temperature oven cure procedures, the polyacrylic acid-based binder tends to emit sulfur odors, which are trapped within the insulation product. This results in an undesired odor profile during product packaging in production and fabrication operations.

U.S. Pat. No. 5,318,990 discloses fibrous glass binders comprising the reaction product of a polycarboxy polymer, a monomeric trihydric alcohol, and a catalyst comprising an alkali metal salt of a phosphorous-containing organic acid. The present invention, in contrast, reacts a low molecular weight polyacrylic acid polymer with a monomeric trihydric alcohol in the absence of added catalyst.

SUMMARY OF THE INVENTION

It has now been found that if the low molecular weight polyacrylic acid is produced employing a phosphorus-based chain transfer agent, such as sodium hypophosphite, satisfactory results can be obtained in the absence of the undesirable sulfur odors.

As an additional and unexpected result, it has further been found that these sulfur-free low molecular weight polyacrylic acids can be crosslinked without the necessity for added cure accelerator.

Accordingly, the present invention provides a process for preparing a binder composition, which comprises the steps of polymerizing acrylic acid monomer in water in the presence of a cure accelerator comprising an alkali metal salt of a phosphorous-containing inorganic acid to form a low molecular weight polyacrylic acid (with molecular weight preferably ranging from 1000 through 10,000, most preferably between 2000 and 6000) and subsequently reacting said low molecular weight polyacrylic acid with a polyhydroxy crosslinking agent in a crosslinking step to make a composition suitable for use as a component in a binder for fiberglass. In this process, the molar ratio of hydroxyl groups in the polyhydroxy crosslinking agent to carboxylic acid groups in the polyacrylic acid may range from 0.4 to 0.6, and more preferably ranges from about 0.47 to about 0.52. In this process according to the present invention, a significant improvement comprises conducting the crosslinking step in the absence of added catalyst.

In this process, the cure accelerator may be sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, sodium tetrametaphosphate, and mixtures thereof. The cure accelerator is most preferably selected from the group consisting of sodium hypophosphite, sodium phosphite, and mixtures thereof.

As the polyhydroxy crosslinking agent in the present invention, one may employ triethanolamine, glycerol, trimethylolpropane, 1,2,4-butanetriol, ethyleneglycol, 1,3-propanediol, 1,4-butanediol, 1,6-hexanediol, pentaerythritol, sorbitol, and mixtures thereof. Most preferably, the polyhydroxy crosslinking agent is selected from the group consisting of triethanolamine and glycerol.

Once a composition suitable for use as a binder component is produced as described above, it may be diluted with sufficient water to provide a binder mixture comprising up to 98 wt-% water, preferably about 50 to 60 wt-% water. Additional components may be included in this aqueous binder mixture. For instance, a hydrolyzed silane coupling agent may to said binder mixture, e.g., in an amount of from 0.01 to 10 wt-% based upon the weight of the composition suitable for use as a binder component. Also, a mineral oil dust suppressing agent to said binder mixture may be included, e.g., in an amount of up to 20 wt-% based upon the weight of said composition suitable for use as a binder component. In this aqueous binder mixture, the weight of the polyacrylic acid-based binder component composition described above will most preferably range from 2 wt-% to 30 wt-% of the binder mixture.

The present invention also contemplates the products of each of the processes described above.

Another important embodiment of the present invention is a process for manufacturing a fiberglass insulation product. This process comprises the step of applying a binder composition as described above onto a fiberglass substrate, and curing the fiberglass substrate so treated. This curing step may preferably be carried out in a curing oven at a temperature from 200° C. to 350° C. for ½ to 3 minutes. The fiberglass insulation product so produced is yet another embodiment of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 provides a Dynamic Mechanical Analysis (DMA) for polyacrylic acid binders using glycerin as a crosslinker.

FIG. 2 provides a DMA for polyacrylic acid binders using triethanolamine as a crosslinker.

DETAILED DESCRIPTION AND PREFERRED EMBODIMENTS OF THE INVENTION

The present invention makes use of a low molecular weight polyacrylic acid prepared by polymerizing acrylic acid monomer in water in the presence of a cure accelerator comprising an alkali metal salt of a phosphorous-containing inorganic acid. The terminology "molecular weight" as used herein refers to weight-average molecular weight in AMU.

A preferred class of such cure accelerators is the alkali metal salts of phosphorous acid, hypophosphorous acid, and polyphosphoric acids. Non-limiting examples of such salts are sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate. Mixtures of two or more of such salts can also be used. Particularly preferred cure accelerators in accordance with the present invention are sodium hypophosphite, sodium phosphite, and mixtures thereof.

The amount of cure accelerator used may vary over wide limits. Based upon the combined weight of the acrylic acid monomer and cure accelerator, the amount of cure accelerator used may vary from about 1% through about 15% by weight. Preferably, the amount of cure accelerator used ranges from 4% to 8% by weight.

In accordance with the present invention, the low molecular weight polyacrylic acid preferably has weight-average molecular weight ranging from 1000 through 10,000. The polyacrylic acid molecular weight herein is most preferably between 2000 and 6000.

The preparation of phosphorus-containing low molecular weight polyacrylic acids that can be used to produce the fiberglass insulation binder compositions of the present invention is illustrated in U.S. Pat. Nos. 5,077,361, 5,294,686, 5,891,972, and 5,866,664.

The low molecular weight polyacrylic acid produced as described above is reacted with a polyhydroxy crosslinking agent, such as triethanolamine, glycerol, trimethylolpropane, 1,2,4-butanetriol, ethyleneglycol, 1,3-propanediol, 1,4-butanediol, 1,6-hexanediol, pentaerythritol, sorbitol, and the like, to make a composition suitable for use as a binder. In accordance with the present invention, no catalyst need be added in this crosslinking step.

The low molecular weight polyacrylic acid and the polyhydroxy crosslinking agent may be mixed with water in a conventional mixing device. Water may be added to the mixture of acrylic acid monomer and polyhydroxy crosslinking agent in any amount which produces an aqueous binder mixture having a viscosity and flow rate suitable for application to a forming fibrous glass mat by any convenient method, e.g., spraying. Water may comprise up to about 98% by weight of the binder mixture. The binders of the present invention may optionally contain adjuvants such as dyes, oils, fillers, thermal stabilizers, flame retardants, lubricants, and such other adjuvants as are conventionally used in the art. Generally, the total amount of such adjuvants employed will not exceed about 20% of the weight of the binder.

In use, the polyacrylic acid-based binder produced as described above is applied onto fiberglass, and the fiberglass so treated is cured and formed into, e.g., an insulation blanket. More specifically, the binder is applied to glass fibers as they are being produced and formed into a mat, water is volatilized from the binder, and the resulting high solids binder-coated fibrous glass mat is heated to cure the binder, thereby producing a finished fibrous glass bat. These cured fiberglass bats may be used as thermal or acoustical insulation products, reinforcement for subsequently produced composites, and so on.

In more detail, application of the binder may proceed as follows. Melted glass is supplied to a fiber forming device such as a spinner or a bushing. Fibers of glass are attenuated from the device and are blown generally downwardly within a forming chamber. The glass fibers typically have a diameter of about 2 to 9 microns and a length of about ¼ to 3 inches. The glass fibers are deposited onto a foraminous forming conveyor. Binder mixture is applied to the glass fibers as they are being formed, e.g. by means of spray applicators, so as to distribute the binder throughout the formed mat of fibrous glass. The glass fibers, having the uncured resinous binder adhered thereto, are gathered and formed into a mat on the conveyor within the forming chamber with the aid of a vacuum drawn through the mat from below the forming conveyor. The residual heat contained in the glass fibers, as well as air flow through the mat, causes much of the water to volatilize from the mat before it exits the forming chamber.

The mat is then conveyed through a curing oven, typically at a temperature from 200 to 325° C. for from ½ to 3 minutes, wherein heated air is passed through the mat to cure the resin. Fibrous glass having a cured, rigid binder matrix emerges from the oven in the form of a bat, which may be processed and utilized in manners well known to those skilled in the art.

The present invention is illustrated by the following non-limiting specific Examples.

SYNTHETIC EXAMPLE 1

Precursor

A low molecular weight polyacrylic acid is prepared by polymerizing acrylic acid monomer in water in the presence of sodium hypophosphite as chain transfer agent. The synthetic process employed is illustrated by U.S. Pat. No. 5,866,664 and the references cited therein. The amount of chain transfer agent is determined by the desired molecular weight of the low molecular weight polyacrylic acid. Suitable low molecular weight commercial products are Acumer 9932 (also known as RD-10077A) produced by Rohm & Haas and GB4-130 produced by ABCO Industries.

SYNTHETIC EXAMPLE 2

Binder

The low molecular weight polyacrylic acid produced in Example 1 is blended with glycerine or triethanolamine to make a composition suitable for use as a binder. A typical binder will have for instance a 0.475 molar ratio of hydroxyl to carboxylic acid.

For example, 75.0 parts of Acumer 9932 (molecular weight 4000–46 wt-% solids, including sodium hypophosphite content 6–7 wt-%) and 10.5 parts of 100% glycerine were blended and diluted with water at room temperature with agitation to give 45 wt-% solids premix. Final binders were prepared by diluting the premix with water to the desired solid level and by adding hydrolyzed silane as coupling agent and mineral oil emulsion as dust suppressing agent. The silane level was between 0.01 to 10% weight based on premix solid. The mineral oil is ranged from 0 to 20% weight based on premix solid. The final binder solid can vary from 2% to 30% depending upon product design.

SYNTHETIC EXAMPLE 3

Insulation

The sulfur-free polyacrylic acid-based aqueous binder produced in Example 2 was applied onto fiberglass, and the fiberglass so treated was cured and formed into an insulation blanket. The molten glass is supplied to a rotary fiber forming device—spinner. Fibers of glass are attenuated from the device and are blown generally downwardly within a forming chamber. The sulfur-free polyacrylic acid-based binder produced in Example 2 was sprayed through nozzles attached to a binder ring by liquid or air atomization. The binder flow rate and solid content were determined by the product design. The lost-on-ignition (LOI) ranged from 1.4% to 25%.

The sulfur-free binder was applied at ambient temperature and most of the water in the binder was volatized as the atomized binder traveled through the hot forming air flow and made contact with the heated glass fiber. The bindered glass fiber blanket was conveyed through a curing oven at a temperature from 200° C. to 350° C. for ½ to 3 minutes. The cured fiber glass blanket can be used as is or further fabricated to tailor the customer demand.

Properties

Binder Stroke Cure Method:

Heat and hold hot plate at 190° C. Pour 2 mL of binder at around 45–50% solid onto the hot plate and start clock right after the sample is poured. Use spatula to mix the binder thoroughly. The fiber formation point (begin) is determined when a stringy and rubbery fiber is formed by spatula and the fiber end (end) point is determined when no more stringy fiber can be pulled from the hotplate by the spatula. The begin and end points are the indication of how long it takes for a binder to start and complete the curing process.

Compositions:

Acumer 9932 is a polyacrylic acid/sodium hypophosphite having a molecular weight of about 4000 and a sodium hypophosphite content of 6–7 wt-%. GB4-130 is a polyacrylic acid/sodium hypophosphite having a molecular weight of about 4190 and a sodium hypophosphite content of 5.71 wt-%. Prior art compositions QRXP 1564, QRXP-1513, and Acumer 1020 are discussed above in the BACKGROUND section.

PROPERTIES EXAMPLE 1

Cure Rate Comparison

The following binders were prepared and the binder stroke cure method was used to determine the cure performance. The themal set binders from the hypophosphite-based polyacrylic acids, Acumer 9932 and GB4-130 showed faster cure rate without any additional cure accelerator than that of corresponding sulfur compound terminated polyacrylic acid (Acumer 1020) thermal set binder with a sodium hypophosphite (SHP) cure accelerator.

TABLE 1

Cure Rate Comparison for Polyacrylic Acid Binders by Stroke Cure

| No. | Polyacrylic Acid | | Crosslinker | | Cure Accelerator | | Fiber Formation(s) | |
|---|---|---|---|---|---|---|---|---|
| | Name | Solid Part | Name | Solid Part | Name | Solid Part | Begin | End |
| 1 | Acumer 1020 | 71.6 | Glycerine | 21.8 | SHP | 5.6 | 21 | 67 |
| 2 | Acumer 1020 | 71.1 | Triethanolamine | 23.3 | SHP | 5.6 | 18 | 49 |
| 3 | Acumer 9932 | 71.6 | Glycerine | 21.8 | — | — | 26 | 51 |
| 4 | GB4-130 | 71.6 | Glycerine | 21.8 | — | — | 21 | 45 |
| 5 | Acumer 9932 | 71.1 | Triethanolamine | 23.3 | — | — | 18 | 37 |

PROPERTIES EXAMPLE 2

Cure Accelerator Level Impact on Cure Rate

The following binder were prepared and the binder stroke cure method was used to determine the cure performance vs cure accelerator levels. The same acid/alcohol molar ratio was used for all the set points, and the only difference among the sodium hypophosphite-based polyacrylic acid set points were the levels of cure accelerator sodium hypophosphite. A sodium bisulfite-based polyacrylic acid binder (Acumer 1020) was also included for comparison. There were no significant differences in cure rate among all the sodium hypophosphite-based polyacrylic acid set points and they were all cured faster than the sodium bisulfite-based polyacrylic acid set point.

TABLE 2

Cure Rate Comparison for Polyacrylic Acid Binders with Different Levels of Cure Accelerators

| No. | Polyacrylic Acid | | Crosslink | | Cure Accelerator | | Fiber Formation(s) | |
|---|---|---|---|---|---|---|---|---|
| | Name | Solid Part | Name | Solid Part | Name | Solid Part | Begin | End |
| 1 | Acumer 1020 | 71.6 | Glycerine | 21.8 | SHP | 5.6 | 21 | 67 |
| 2 | Acumer 9932 | 76.7 | Glycerine | 23.3 | SHP | 0.0 | 26 | 51 |
| 3 | Acumer 9932 | 75.9 | Glycerine | 23.1 | SHP | 1.0 | 24 | 49 |
| 4 | Acumer 9932 | 75.2 | Glycerine | 22.8 | SHP | 2.0 | 25 | 44 |
| 5 | Acumer 9932 | 74.4 | Glycerine | 22.6 | SHP | 3.0 | 23 | 50 |
| 6 | Acumer 9932 | 72.9 | Glycerine | 22.1 | SHP | 5.0 | 29 | 47 |

PROPERTIES EXAMPLE 3

Dynamic Mechanical Analysis (DMA) for Reaction Rate Comparison

Five polyacrylic acid binders were prepared as listed in Properties Example 1. The dynamic mechanical analysis chart for three polyacrylic acid binders using glycerines as crosslinker is illustrated in FIG. 1. The two hypophosphite-based polyacrylic acid binders without additional cure accelerator clearly showed a cure reaction rate higher than that of sodium bisulfite-based polyacrylic acid binder with additional cure accelerator. The same trend was observed for the compositions using triethanolamine as a crosslinker as illustrated by FIG. 2.

PROPERTIES EXAMPLE 4

Low Lost-on-Ignition (LOI) Fiber Glass Insulation Product Manufacture

Five set points of polyacrylic acid-based binders with glycerine as crosslinker were prepared according to the following formulations and included conventional adjuvants, such as oil, lubricants, coupling agents, dyes, fillers, thermal stabilizers, flame retardants, and corrosion inhibitors. The binders were prepared according to a typical fiber glass process and their solids were prepared to target at 1.9% lost-on-ignition (LOI) based on glass. The trial was conducted in a typical fiber glass production line with 8 fiberizers and the bindered fiber glass mats were cured through an oven temperature ranged from 200° C. to 325° C. The products had the density of around 1 pound per cube feet and thickness of 1 inch with or without bisect. Bond strength, an measure for mat integrity, was determined by Instron machine. The results indicated that the hypophosphite based polyacrylic acid binders with or without cure accelerator can perform equivalent or better than that of bisulfite based polyacrylic acid binder with cure accelerator.

TABLE 3

Bond Strength for Polyacrylic Acid Binders at 1.9% LOI

| Polyacrylic Acid | | OH/Acid | Bond |
|---|---|---|---|
| Name | Terminator | Molar Ratio | Strength |
| Acumer 1020 | Bisulfite | 0.47 | 2.95 |
| Acumer 9932 | Hypophosphite | 0.47 | 3.38 |
| Acumer 9932 | Hypophosphite | 0.52 | 3.98 |
| Acumer 9932 | Hypophosphite | 0.47 | 4.04 |
| Acumer 9932 | Hypophosphite | 0.52 | 3.28 |

PROPERTIES EXAMPLE 5

High LOI Fiber Glass Insulation Product and Odor Ranking

A variety of polyacrylic acids including two hypophosphite-based ones, Acumer 9932 and GB-4130, were formulated as binders and applied onto fiber glass as under typical production process. The binder solids were targeted at around 10% and the product density was 6 pound per cube feet. The bindered insulation material were cured and formed fiber glass insulation blanket. 100 grams of samples were taken from each set point and sealed in a 9 oz jar with 50 mL of water. A panel testing composed of 29 people was conducted to rank odor emitted from these products. The panel was instructed to rank 0 as completely no smell and 10 as unacceptible odor. The results indicated two phosphite terminated polyacrylic acid-based binder achieved lowest odor and they were completely free from sulfur odor. The mechanic properties (bond strength and compressive strength) of these hypophosphite-based polyacrylic acid binders were comparable to that of bisulfite-based polyacrylic acid binders. Some odor may result from binder degradation.

TABLE 4

Odor Rankings

| SP | LOI (%) | Bond Strength (psf) | Compressive Strength (psf) | Odor Ranking | Polyacrylic Acid used (same glycerine and ratios were used for all set points) |
|---|---|---|---|---|---|
| 0 | 7.02 | 47 | 546 | 4.9 | QRXP-1564, sulfur compound terminator |
| 1 | 9.86 | 50 | 469 | 5.5 | QRXP-1513, triethanolamine as X-linking |
| 6 | 9.64 | 63 | 550 | 2.4 | GB4-130, hypophosphite as chain transfer agent |
| 8 | 9.87 | 69 | 582 | 3.3 | Acumer 9932, hypophosphite as chain transfer agent |

The entire disclosure of each of the patents and publications cited hereinabove is hereby expressly incorporated herein by reference.

While this invention has been illustrated by reference to specific embodiments thereof, modifications and variations of the disclosure herein will readily occur to those skilled in the art.

What is claimed is:

1. A composition suitable for use as a component in a binder for fiberglass, comprising:
   a polyacrylic acid having a weight-average molecular weight ranging from 1,000 to 10,000 polymerized from an acrylic acid monomer in the presence of a phosphorus based regulating agent to form a phosphite regulated polyacrylic acid, said regulating agent being suitable for use as an accelerating agent in a subsequent reaction step, and crosslinked by a polyhydroxy crosslinking agent, wherein a molar ratio of hydroxyl groups in said polyhydroxy crosslinking agent to carboxylic acid groups in said polyacrylic acid ranges from 0.4–0.6.

2. The composition of claim 1, wherein said phosphorus based regulating agent comprises a constituent selected from the group consisting of sodium hypophosphite, sodium phosphite, potassium phosphite, disodium pyrophosphate, tetrasodium pyrophosphate, sodium tripolyphosphate, sodium hexametaphosphate potassium phosphate, potassium polymetaphosphate, potassium polyphosphate, potassium tripolyphosphate, sodium trimetaphosphate, sodium tetrametaphosphate and mix thereof.

3. The composition of claim 2, wherein said phosphorusone based regulating agent is selected from the group consisting of sodium hypophosphite, sodium phosphite and mixtures thereof.

4. The composition of claim 1, wherein said weight-average molecular weight is between 2,000 and 6,000.

5. The composition of claim 1, wherein said polyhydroxy crosslinking agent is selected from the group consisting of glycerol, triethanolamine, trimethylolpropane 1,2,4-butanetriol, ethyleneglycol, 1,3-propanediol, 1,4-butanediol, 1,6-hexanediol, pentaerythritol, sorbitol and mixtures thereof.

6. The composition of claim 1, further comprising a hydrolyzed silane coupling agent.

7. The composition of claim 6, wherein said hydrolyzed silane coupling agent is present in an amount of from 0.01 to 10 wt % based upon the weight of said composition suitable for use as a binder component.

8. The composition of claim 1, further comprising a mineral oil dust suppressing agent.

9. The composition of claim 8, wherein said mineral oil dust suppressing agent is present in an amount up to 20 wt % based upon the weight of said composition suitable for use as a binder component.

10. The composition of claim 1, further comprising an adjuvant selected from the group consisting of dyes, oils, fillers, thermal stabilizers, flame retardants, lubricants and mixtures thereof.

11. A composition suitable for use as a binder for fiberglass consisting essentially of:

a polyacrylic acid having a weight-average molecular weight of from 1,000 to 10,000 polymerized from an acrylic acid monomer in the presence of a phosphorus based regulating agent to form a phosphite regulated polyacrylic acid, said regulating agent being suitable for use as an accelerating agent in a subsequent reaction step, and crosslinked by a polyhydroxy crosslinking agent selected from the group consisting of triethanolamine, glycerol, trimethylolpropane, 1,2,4,-butanetriol, ethyleneglycol, 1,3-propanediol, 1,4-butanediol, 1,6-hexanediol, pentaerythritol, sorbitol and mixtures thereof.

12. The composition of claim 11, wherein said weight-average molecular weight is between 2,000 and 6,000.

13. The composition of claim 11, wherein said phosphorus based regulating agent comprises a constituent selected from the group consisting of sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, sodium tetrametaphosphate and mixtures thereof.

14. The composition of claim 13, wherein said phosphorus based regulating agent is selected from the group consisting of sodium hypophosphite, sodium phosphite and mixtures thereof.

15. The composition of claim 11, wherein a molar ratio of hydroxyl groups in said polyhydroxy crosslinking agent to carboxylic acid groups in said polyacrylic acid ranges from 0.4–0.6.

* * * * *